UNITED STATES PATENT OFFICE.

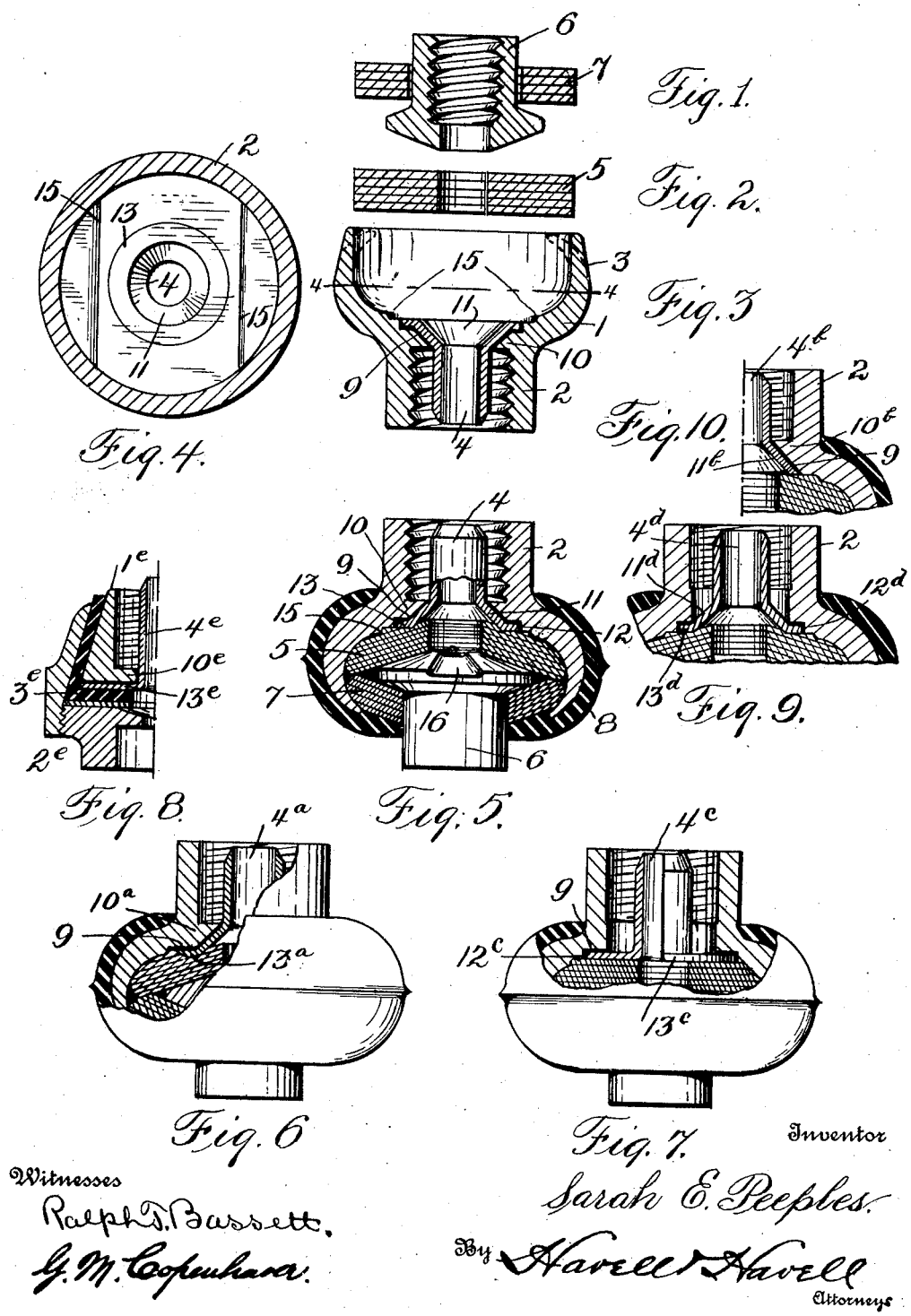

SARAH E. PEEPLES, OF WASHINGTON, DISTRICT OF COLUMBIA.

INSULATED PIPE JOINT OR COUPLING.

997,087.     Specification of Letters Patent.     Patented July 4, 1911.

Application filed October 18, 1910. Serial No. 587,715.

*To all whom it may concern:*

Be it known that I, SARAH E. PEEPLES, a citizen of the United States, residing at Washington, in the District of Columbia, have invented new and useful Improvements in Insulated Pipe Joints or Couplings, of which the following is a specification.

This invention relates to certain new and useful improvements in insulated joints or couplings for gas and electric fixture pipes, of which the following is a full, clear and exact description.

The primary object of the invention, is to so construct the coupling that the moisture of condensation, luting, or other deleterious agent, will be collected and prevented from flowing or trickling down upon and over the insulation and thereby short-circuiting the joint and injuring the insulation.

The invention has particular reference to the manner of applying the collecting means to joints.

Reference will be had to the accompanying drawings forming a part of this specification and wherein like numerals of reference designate corresponding parts throughout the several views, in which:

Figures 1, 2 and 3 show the various parts of the joint or coupling in position for assemblage, Fig. 4, is a horizontal sectional view taken on line 4—4 of Fig. 3, Fig. 5, is a vertical sectional view of a finished joint or coupling, Figs. 6 and 7 are views in elevation of modified forms of joints partly broken away in section, Fig. 8 is a view in vertical half-section of another form of joint or coupling with the invention applied thereto, and Figs. 9 and 10 are views in vertical section of fragments showing other modifications.

In Figs. 1, 2 and 3 the parts of the coupling are shown in inverted position for assemblage. The upper coupling member 1 comprises a threaded socket or neck 2 having a cup-shaped base 3, the walls thereof being flexible. The nipple or tubular member 4 is first placed into the cupped-base 3 so as to extend into the threaded socket or neck 2 and the laminæ of mica insulation 5 is then inserted in the cupped-base 3 and the other or lower coupling member 6 and the outer laminæ of mica insulation 7 then inserted, after which the flexible walls of the cupped base 3 are flanged over as indicated by dotted lines in Fig. 3 and the insulating coating 8 applied, thereby completing the coupling illustrated in Fig. 5. The great pressure employed in compacting the insulation together with the cement 9, (such as asphaltum,) insures a sealed joint against the passage of moisture or luting between the nipple and the upper coupling member onto the insulation.

In Fig. 5 the neck 2 is provided at its base with an interior annular flange 10 having a beveled inner face against which seats the flared portion 11 of the nipple 4, said coupling member 1 being further provided in its lower face with a milled seat 12 to receive the flanged lower end 13 of the nipple.

In Fig. 6 a similar flange $10^a$ is provided for the flared portion $11^a$ of the nipple $4^a$ but no milled seat is provided for the flange $13^a$ the latter being tapered away toward its outer edge rendering a seat unnecessary. Likewise in Fig. 10, a flange $10^b$ is provided for the flared portion $11^b$ of the nipple $4^b$, but no flange other than the flared portion is employed.

To increase the capacity of the pocket for the collection and retention of moisture and luting, in some instances, no flange, such as 10 in Fig. 5, is provided on the upper coupling. In Figs. 7 and 9 this is noted, together with the fact that the threads on the neck 2 do not extend to the bottom of the same. In Fig. 7, the nipple $4^c$ is provided with a right angular flange $13^c$ seated in milled seat $12^c$, and in Fig. 9 the nipple $4^d$ has a flared portion $11^d$ terminating in flange $13^d$ seated in milled seat $12^d$ in the upper coupling member.

In Fig. 8 the invention is seen applied to another form of nipple. The upper and lower coupling members $1^e$ and $2^e$ respectively are separated by insulation $3^e$. The upper member is provided with an apertured bottom forming a collar $10^e$ through which extends the nipple $4^e$, the latter having a right angular flange $13^e$ of the same diameter as the bottom of the upper coupling member. It is apparent that collar $10^e$ could be omitted in accordance with the showing in Fig. 7.

In all of the forms except Fig. 8, the cupped-base 3 is provided, as is customary, with ribs 15, (see Fig. 4) which together with notches 16 or equivalents (seen in Fig. 5), embed themselves, or vice versa, in the mica insulation 5 to prevent turning of the parts after assemblage.

In use, water of condensation flowing down the service pipe or a surplusage of luting on the threads of the upper coupling, will be intercepted and collected and retained in the pocket formed by the nipple and prevented from flowing down onto the insulation or through the coupling. No moisture or luting can trickle through the joint between the nipple and upper coupling member and into the insulation because of the cement 9, which, together with the great force with which the nipple is pressed against the upper coupling member, completely and effectually seals such joint.

The milled seat not only permits close contact between the nipple and upper coupling member, but insures against the nipple becoming canted during the assemblage of the joint.

Having thus described the invention, what is claimed as new and useful and desired to be secured by Letters Patent is:—

1. A device of the character described, comprising coupling members, insulation therebetween, a tubular moisture and luting collecting and retaining member extending upwardly into the upper coupling member and being flanged at its lower end, said flange being secured above the insulation and between the same and the upper coupling member.

2. A device of the character described, comprising coupling members, insulation therebetween, the upper coupling member being provided with an interior annular flange, a tubular moisture and luting collecting and retaining member extending upwardly into the said upper coupling member and having a flared lower end portion, said flared end portion being secured between said flange and the insulation.

3. A device of the character described, comprising coupling members, insulation therebetween, the upper coupling member being provided with an interior annular flange having a beveled face, a tubular moisture and luting collecting and retaining member extending upwardly into the said upper coupling member and having a flared lower end portion, said flared end portion being seated upon the beveled face of said flange and secured between the same and the insulation.

In testimony whereof I have hereunto set my hand in presence of two subscribing witnesses.

SARAH E. PEEPLES.

Witnesses:
J. D. YOAKLEY,
RALPH T. BASSETT.

Copies of this patent may be obtained for five cents each, by addressing the "Commissioner of Patents, Washington, D. C."